United States Patent
Hoelsaeter

(10) Patent No.: US 9,216,500 B2
(45) Date of Patent: Dec. 22, 2015

(54) TOOL FOR SIMPLIFYING ATTACHMENT OF HOSE TO NIPPLE

(76) Inventor: Geir Hoelsaeter, Eidsvoll (NO)

(*) Notice: Subject to any disclaimer, the term of this patent is extended or adjusted under 35 U.S.C. 154(b) by 354 days.

(21) Appl. No.: 13/993,134

(22) PCT Filed: Dec. 12, 2011

(86) PCT No.: PCT/NO2011/000342
§ 371 (c)(1), (2), (4) Date: Jun. 11, 2013

(87) PCT Pub. No.: WO2012/121603
PCT Pub. Date: Sep. 13, 2012

(65) Prior Publication Data
US 2013/0283582 A1   Oct. 31, 2013

(30) Foreign Application Priority Data

Jan. 13, 2011   (NO) .................................. 20110053

(51) Int. Cl.
*B25B 27/10*   (2006.01)
*B23P 19/02*   (2006.01)

(52) U.S. Cl.
CPC .............. *B25B 27/10* (2013.01); *B23P 19/02* (2013.01); *Y10T 29/4987* (2015.01); *Y10T 29/5367* (2015.01)

(58) Field of Classification Search
CPC ..................................................... B25B 27/10
USPC .................................... 29/235, 237, 268, 270
See application file for complete search history.

(56) References Cited

U.S. PATENT DOCUMENTS

| 2,373,478 | A | * | 4/1945 | Kuhn | 81/302 |
| 2,656,597 | A | * | 10/1953 | Meirion | 29/221 |
| 3,281,927 | A | * | 11/1966 | Buslaff | 29/235 |
| 4,467,512 | A | * | 8/1984 | Modes | 29/237 |
| 4,571,808 | A | * | 2/1986 | King | 29/268 |
| 5,077,879 | A | * | 1/1992 | Haviv | 29/268 |
| 5,709,660 | A | * | 1/1998 | Doyle et al. | 604/116 |
| 6,658,711 | B1 | | 12/2003 | Benson | |
| 2002/0058965 | A1 | | 5/2002 | Andrews | |
| 2007/0244490 | A1 | | 10/2007 | Moehle et al. | |

FOREIGN PATENT DOCUMENTS

WO   9966976 A2   12/1999

OTHER PUBLICATIONS

International Search Report dated Apr. 2, 2012.

* cited by examiner

*Primary Examiner* — Lee D Wilson
*Assistant Examiner* — Tyrone V Hall, Jr.
(74) *Attorney, Agent, or Firm* — Alix, Yale & Ristas, LLP

(57) ABSTRACT

Tool (11) for simplified attachment of hose over a nipple, comprising two separate tool parts (12, 13) which each has a free end (121, 131) with a curved profile forming a convex side (126 resp. 136) and a concave side (127 resp. 137) arranged to be inserted into a tube end when the convex sides are equally oriented on both tool parts. At a distance from their free ends the tool parts each has an operating handle (123, 133) enabling rotation of the second tool part (13) of the tool 180 degrees in relation to the first tool part (12) thereby bringing the concave sides (127, 137) of said free ends of the tool parts to face one another. Method for use of the tool is also comprised.

7 Claims, 2 Drawing Sheets

TOOL FOR SIMPLIFYING ATTACHMENT OF HOSE TO NIPPLE

BACKGROUND

The present invention concerns a device for simplified attachment of a hose to a nipple and a method for use of such an inventive tool.

In many situations a hose, typically a rather soft hose, needs to be attached to a hose nipple for forming a temporary or permanent liquid-tight connection. It may be areas of use where a rather insubstantial pressure builds in the hose but still where it is important that the connection is tight for its intended duration. Such connections are common in industrial applications, within domestic areas and especially in medical applications, such as when connecting a uridome to patients which are unable to control their urination.

It is a substantial problem that the adaptation between hose and nipple needs to be very tight to ensure that the connection is liquid tight, and that it is difficult to apply the force required to push the relatively soft hose far enough onto the nipple to ensure that the connection is tight or even to ensure that it is sufficiently attached to not come loose. At the same time, in situations like connection of a uridome, it is a stressful and uncomfortable situation for the patient and healthcare professional, and therefore time is of the essence. With known systems, it is not uncommon for an adequate connection to require several minutes of time. Alternatively one trades time for a poor connection which is at risk for disengagement or leakage.

SUMMARY

It is thus an object of the disclosure to provide an apparatus and a method for quickly and easily establishing an adequate connection between a hose and a nipple.

It is a further object of the disclosure to achieve the above object by means of conventional hoses and nipples which are already in the marked.

The disclosed tool can reliably create a secure connection between hose and nipple, within a period of less than 30 seconds, and commonly under 10 seconds and there is little requirement for learning its use. The tool comprises two tool parts which in a preferred embodiment may seem nearly identical or symmetrical. Both tool parts comprise a free end which is adapted to be pushed into the hose in question and a handle at the opposite end. Between the handle and the free end is positioned an intermediate part which is so adapted that when the tool parts are positioned adjacent one another with the concave surfaces facing each other at the free ends of the tool parts, there is an open cavity between the intermediate parts. This open cavity is large enough to receive a nipple of relevant size which is pushed in between the intermediate parts and into the cavity having the a frusto-conical shape formed between the free ends of the tool parts, the cavity with such shape being defined by the concave surfaces of the tool parts facing each other, the curvature forming the concave surfaces having a gradually reduced radius with increasing distance from the intermediate parts.

BRIEF DESCRIPTION OF THE DRAWINGS

The invention shall hereinafter be described in the form of a preferred embodiment with reference to the enclosed drawings.

FIG. 3b shows the profile of the free end of the tool as shown in FIG. 3a, and FIG. 4 shows the projection of a tool part seen from above when compared to FIG. 3a.

DETAILED DESCRIPTION

Figure 1:
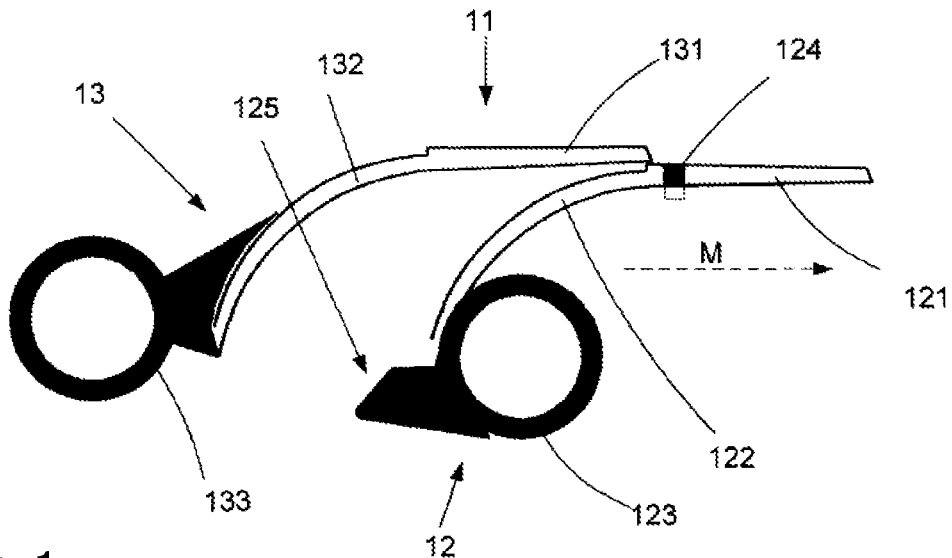
FIG. 1 is a side view of an embodiment of the disclosed attachment tool prior to insertion in a hose.

FIG. 1 shows tool 11 comprising two separate tool parts 12 and 13. Contrary to a plier or a scissor, which comprise two parts hinged together in order to provide a desired cooperative function, the parts 12 and 13 are separate from one another but still cooperative. Each tool part 12, 13 has a free end 121, 131 which during use is arranged to be eased into the end of a hose. The easing movement is typically in the direction of the arrow M in FIG. 1. Each part 12, 13 is furthermore shown with a respective handle 123, 133. Tool part 12 furthermore has a mark 124 illustrating how far into the end 14 of a hose the free end is to be eased. The mark 124 can also have the form of a physical extension (i.e., stapled line), which makes further movement into the hose difficult or impossible. The arrow M also illustrates which direction is considered the longitudinal direction of the tool parts 12, 13. Tool part 12 is shown with a shoulder 125 near the handle 123. The purpose of the shoulder 125 is to come to rest against the handle 133 of tool part 13 when the latter has been moved appropriately forward in relation to tool part 12. Alternatively other portions of the tool parts 12, 13, such as part of or the entire intermediate parts 122, 132 between the handles and the free ends may come to rest against one another when the mutual axial position of the tool parts is as desired. The intermediate parts 122, 132 of the respective tool parts are curved away from the longitudinal direction of each respective tool part 12, 13 in order to, during use, make space for a nipple to be inserted between the two.

Figure 2A:
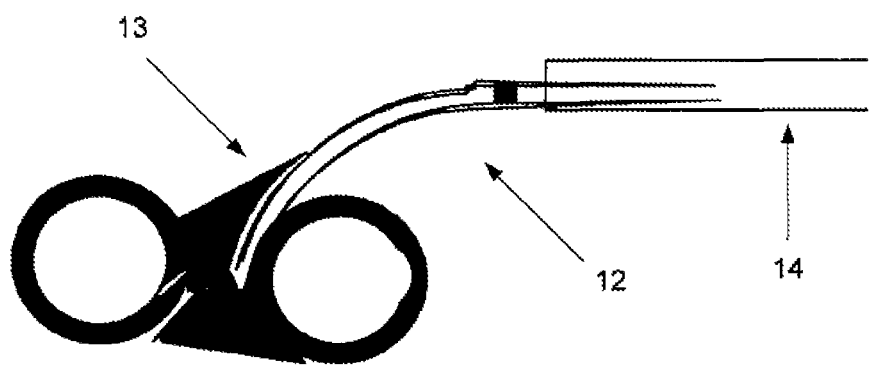
FIG. 2a is a side view of the tool of FIG. 1 after insertion into the end of a hose.
Figure 2B:
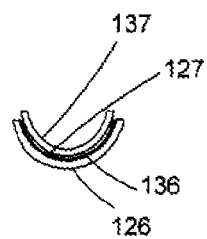
FIG. 2b shows a section of the profile of the free end of the tool as shown in FIG. 2a, FIG. 3a is a side view showing the tool of the previous Figs. after a subsequent operating step.

FIG. 2a shows a first step of a working operation with the tool 11. Here the tool parts are shown with their free ends 121, 131—up to the mark 124—inserted in a hose end 14. It is here apparent that the handles 123, 133, included the shoulder 125 are resting against one another. The insertion into the hose end 14 is simple, mainly because the free ends 121, 131 have common orientation, i.e. the concave sides 127, 137 are facing same direction as shown by FIG. 2b. It is possible to insert the free end 121 of tool part 12 into the hose end first and thereafter the free end 131 of tool part 13, but it is also possible to insert both free ends 121, 131 of the tool parts 12, 13 at the same time, after first mutually orienting the tool parts 12, 13 as shown in FIG. 2a.

Figure 3A:
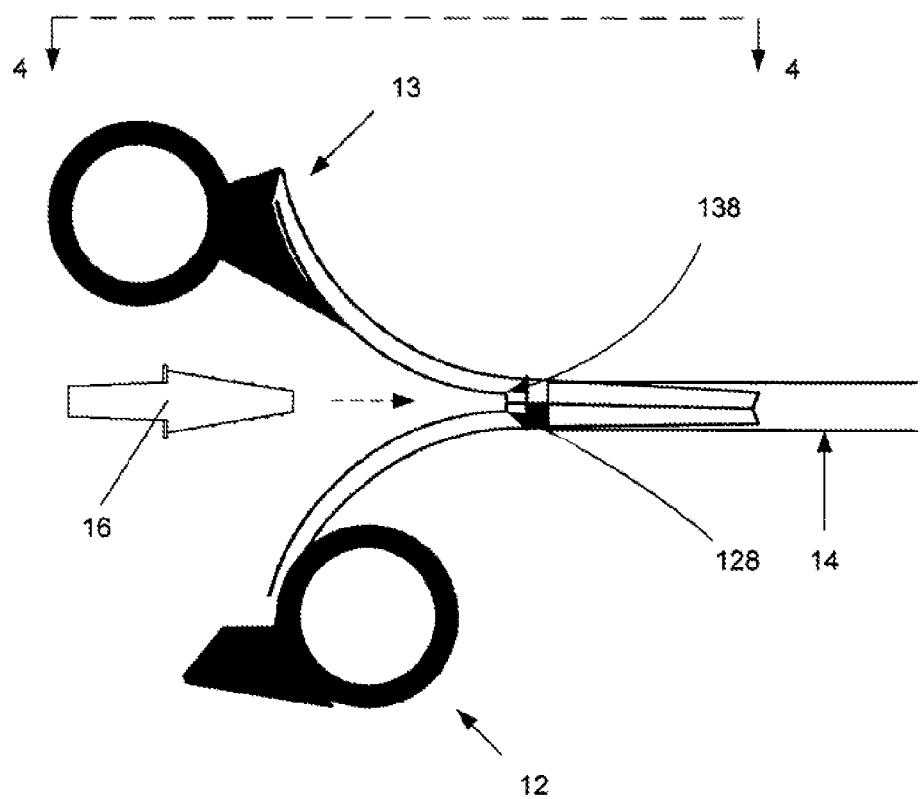
Figure 3B:
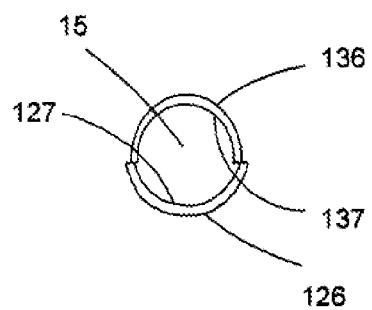

FIG. 3a shows the tool parts after next working operation. Here tool part 13 has been rotated 180 degrees about its length axis, i.e. an axis parallel with the arrow M in FIG. 1. This pivot is easy to accomplish since the tool parts 12 and 13 are provided with handles 123, 133 to grip, and will imply that the free ends 121, 131 of the tool parts have their concave sides 127, 137 facing one another, thereby extending the cross-section of the hose end 14 somewhat (provided that the tool is correctly dimensioned in relation to the hose and nipple in question). The free ends 121, 131 in this position are shown in cross-sectional view in FIG. 3b. As disclosed from FIG. 3b the concave sides 127, 137 of the respective tool parts 12, 13 are facing one another while the convex sides 126, 136 are facing outwards. There is now a free passage for insertion of a nipple 16 in the direction shown by the arrow I in FIG. 3a into the void 15, having a frusto-conical shape between the concave surfaces 127, 137. Also the curvature of the intermediate parts 122, 132 away from the general length direction of the respective tool parts, contributes to ensure space for the insertion of the nipple 16. As also shown by FIG. 3a, the free ends 121, 131 are initiated by each respective shoulder 128, 138, the reason for this primarily being to create larger distance between the intermediate parts 122, 132 to ensure that the mentioned nipple collar does not force the tool parts 12 and 13 unnecessarily far apart resulting in an undesired, excessive extension of the hose end 14 and to ensure that the force required to subsequently remove the tool parts does not become too high. It should be mentioned that not all nipples have a collar. Also, the shoulders 128, 138 do not represent a mandatory feature for use with collared or un-collard nipples.

When the nipple has been inserted sufficiently far into the void 15 between the concave sides 127 and 137, and thereby sufficiently far into the hose, the tool parts 12, 13 can be pulled out from the hose end, preferably separately, while the nipple 16 is supported by a finger to not be removed therewith. One or both of the tool parts 12, 13 can further more be provided with a marker to show how far the nipple is to be pushed in, or the shoulders 128, 138 can be arranged in a position to also function as such a marker.

Figure 4:
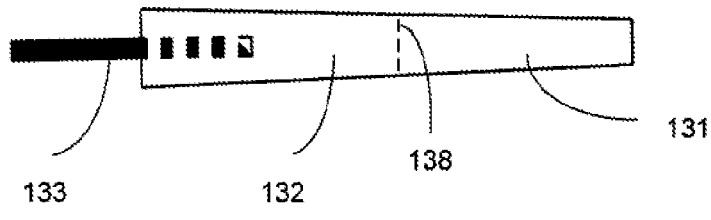

FIG. 4 shows the profile of tool part 13 (from FIG. 3a) seen from above, with handle 133 to the left, intermediate part 132 as well as the free end 131 commencing at the shoulder 138.

FIG. 4 illustrates how the intermediate part 132 and above all the free end 131 preferably are gradually tapered from handle 131 towards the free end 131, which also implies that radius for the radius for the curvature (convex/concave) at the free end is reduced in the same direction. A corresponding profile of tool part 12 would have shown a similar tapering in the direction from the handle to the free end. It should be mentioned that the shape of the intermediate parts and the handles not are critical and the shown embodiments are just exemplary thereof. The handles need not have open "eyes" to allow finger penetration but can have any suitable shape. The intermediate parts need not be evenly curved; they only need to have a shape allowing space for a nipple to be moved in therebetween.

The invention claimed is:

1. A tool (11) for simplified connection of hose to a nipple, comprising a first tool part (12) and second tool part (13) which each has a free end (121, 131) with a curved profile forming a convex side (126, 136) and a concave side (127, 137) arranged to be inserted into a tube end when the respective convex sides (126, 136) are equally oriented, each tool part having an operating handle (123, 133) spaced from the respective free end allowing rotation of the second tool part (13) of the tool approximately 180 degrees relative to the first tool part (12), thereby bringing the concave sides (127, 137) of said free ends of the tool parts to face one another.

2. The tool of claim 1, wherein the respective free ends (121, 131) having convex sides (126, 136) and concave sides (127, 137) are sized and shaped to define a cavity (15) when the concave sides (127, 137) are facing one another.

3. The tool of claim 2, wherein said cavity (15) has a frusto-conical shape with a gradually reduced diameter corresponding substantially to the outer diameter of a relevant nipple (16).

4. The tool of claim 1, wherein the first tool part (12) has a shoulder (125) proximate the operating handle (123), said shoulder (125) being arranged to rest against the operating handle (133) of the second tool part (13) when the first and second tool parts (12, 13) are positioned with their convex sides (126, 136) aligned.

5. The tool of claim 1, wherein the first tool part (12) has a mark (124) arranged to indicate when the tool part has been inserted to desired extent into a hose end (14).

6. The tool of claim 5, wherein the mark (124) comprises an extension positioned to obstruct or prevent the first tool part (12) from being inserted inconveniently far into a hose end (14).

7. A method for attachment of a hose having an end to a nipple, comprising:
   inserting a free end of a first tool part (121) and a free end of a second tool part (131) into the end (14) of the hose, wherein each of said first and second part free ends (121, 131) has a curved transverse profile in relation to its longitudinal direction defining a convex side (126, 136) and a concave side (127, 137) with the convex sides and the concave sides of the tool parts (12, 13) mutually equally oriented;
   rotating the second tool part (13) approximately 180 degrees relative to the first tool part (12), thereby orienting the respective concave surfaces (127, 137) of the free ends of the tool parts (12, 13) with one another and defining a cavity (15) therebetween;
   pushing an end of a nipple (16) into the cavity (15); and
   removing the tool parts from the hose end (14) leaving at least a portion of the nipple (16) within the hose end (14).

* * * * *